US012779421B2

(12) United States Patent
Lee et al.

(10) Patent No.: US 12,779,421 B2
(45) Date of Patent: Nov. 3, 2026

(54) SPARGER AND REACTOR COMPRISING THE SAME

(71) Applicant: LG Chem, Ltd., Seoul (KR)

(72) Inventors: Hong Min Lee, Daejeon (KR); Joon Ho Shin, Daejeon (KR); Jeong Seok Lee, Daejeon (KR); Moon Sub Hwang, Daejeon (KR); Jong Hun Song, Daejeon (KR); Kyung Seog Youk, Daejeon (KR)

(73) Assignee: LG Chem, Ltd., Seoul (KR)

( * ) Notice: Subject to any disclaimer, the term of this patent is extended or adjusted under 35 U.S.C. 154(b) by 805 days.

(21) Appl. No.: 18/026,032

(22) PCT Filed: Jul. 1, 2022

(86) PCT No.: PCT/KR2022/009532

§ 371 (c)(1),
(2) Date: Mar. 13, 2023

(87) PCT Pub. No.: WO2023/090564

PCT Pub. Date: May 25, 2023

(65) Prior Publication Data

US 2024/0286099 A1 Aug. 29, 2024

(30) Foreign Application Priority Data

Nov. 18, 2021 (KR) ........................ 10-2021-0159855

(51) Int. Cl.

*B01J 4/00* (2006.01)
*B01J 8/18* (2006.01)
*B01J 8/22* (2006.01)

(52) U.S. Cl.

CPC ............. *B01J 4/004* (2013.01); *B01J 8/1818* (2013.01); *B01J 8/22* (2013.01); *B01J 2208/00911* (2013.01)

(58) Field of Classification Search

CPC ........................................................ C07C 2/08
See application file for complete search history.

(56) References Cited

U.S. PATENT DOCUMENTS 2,191,919 A * 2/1940 Thayer ................. B01D 11/043 422/256
3,133,128 A 5/1964 Gerald
3,197,387 A * 7/1965 Lawrance ................. C02F 1/06 202/195

(Continued)

FOREIGN PATENT DOCUMENTS

CN 1600413 A 3/2005
CN 201605166 U * 10/2010

(Continued)

OTHER PUBLICATIONS

KR 102100463 (Year: 2025).*

(Continued)

*Primary Examiner* — Dapinder Singh
(74) *Attorney, Agent, or Firm* — Lerner David LLP

(57) ABSTRACT

Provided is a sparger including: a main body including a plurality of holes, a protruding pipe extending upward along an outer circumferential surface of the plurality of holes, and a side pipe extending from a side surface of the protruding pipe.

10 Claims, 4 Drawing Sheets

(56) References Cited

U.S. PATENT DOCUMENTS 3,630,851 A * 12/1971 Kawaguchi ............ B01D 3/065
203/88
6,932,889 B1 * 8/2005 Holcomb ................. B01D 3/10
202/205
7,112,262 B2 * 9/2006 Bethge ................. B01D 5/0012
202/205
7,718,138 B2 * 5/2010 Krejci .................... B01J 8/1818
261/114.5
8,302,426 B2 * 11/2012 de Larminat ............. F28D 3/04
62/515
9,683,784 B2 * 6/2017 Christians ................. F28D 3/02
2009/0068084 A1 3/2009 Jeon
2010/0307416 A1 12/2010 Park et al.
2013/0134101 A1 5/2013 Blendinger et al.
2016/0187061 A1 6/2016 Urbanski et al.
2017/0113199 A1 4/2017 Palmer et al.
2017/0210708 A1 * 7/2017 Nelson .................... C07C 37/08
2020/0147575 A1 5/2020 Tebianian et al.
2020/0368707 A1 11/2020 Zhao et al.
2021/0220790 A1 7/2021 Park et al.
2021/0269918 A1 9/2021 Batzer et al.
2022/0395794 A1 12/2022 Son et al.
2022/0407133 A1 12/2022 Son et al.
2023/0072605 A1 * 3/2023 Raja ........................... B01J 8/22
2023/0211358 A1 * 7/2023 Hunt ...................... B01F 23/808
210/221.2
2023/0356166 A1 * 11/2023 Raja ....................... B01J 10/002

FOREIGN PATENT DOCUMENTS

CN 202322761 U 7/2012
CN 206853645 U 1/2018
CN 108031410 A 5/2018
CN 213132665 U 5/2021
EP 0832877 A2 4/1998
JP H04169702 A 6/1992
JP H10309597 A 11/1998
JP H11140961 A 5/1999
KR 19890000633 3/1989
KR 19900005094 3/1989
KR 19920007683 5/1992
KR 20050002234 A 1/2005
KR 20090025571 A 3/2009
KR 20090036693 A 4/2009
KR 20100130748 A 12/2010
KR 20120078350 A 7/2012
KR 20140106101 A 9/2014
KR 20140124457 A 10/2014
KR 20190132118 A 11/2019
KR 20200004339 A 1/2020
KR 102100463 B1 * 4/2020 .............. C02F 3/207
KR 20200085863 A 7/2020
KR 20200105270 A 9/2020
KR 20210105209 A 8/2021
WO 2021-132923 A1 7/2021
WO 2021167345 A1 8/2021

OTHER PUBLICATIONS

International Search Report for Application No. PCT/KR2022/009532 mailed Oct. 5, 2022, pp. 1-3. [See p. 2, categorizing the cited references].

Extended European Search Report for Application No. 22862402.9 dated Aug. 25, 2023. 9 pgs.

* cited by examiner

【FIG. 1】
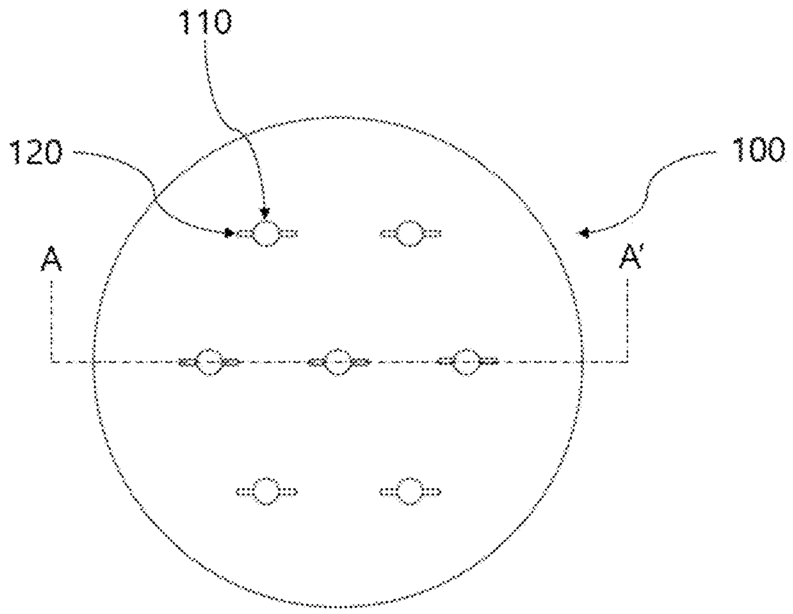

【FIG. 2】
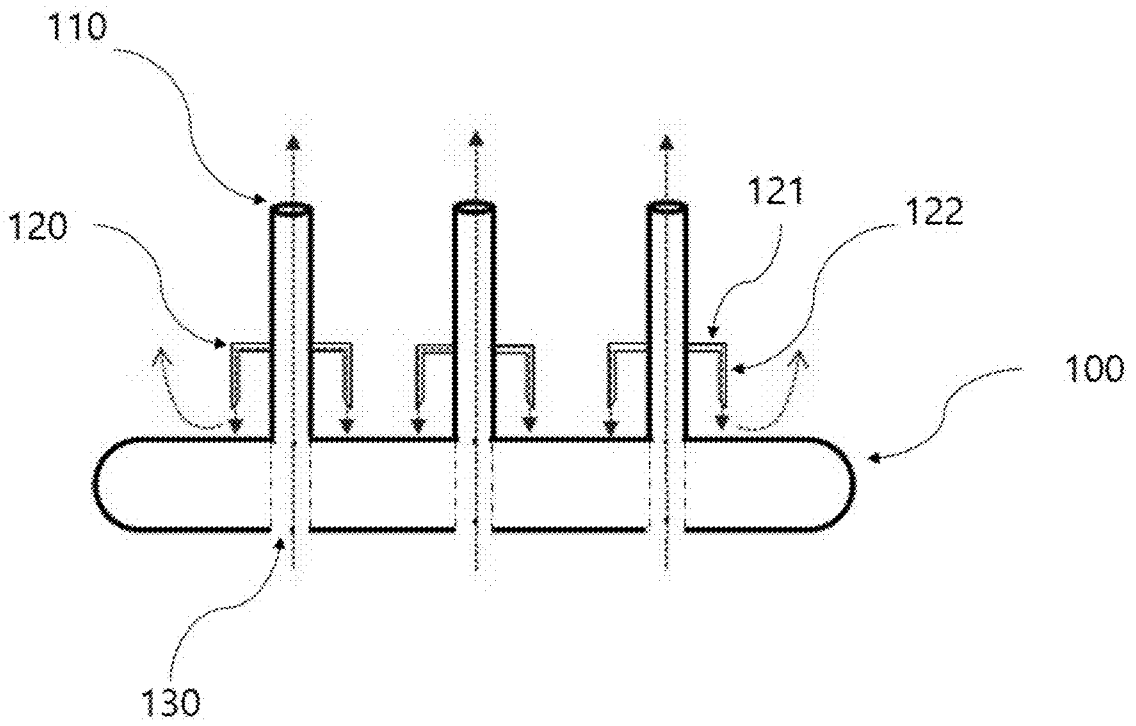
【FIG. 3a】
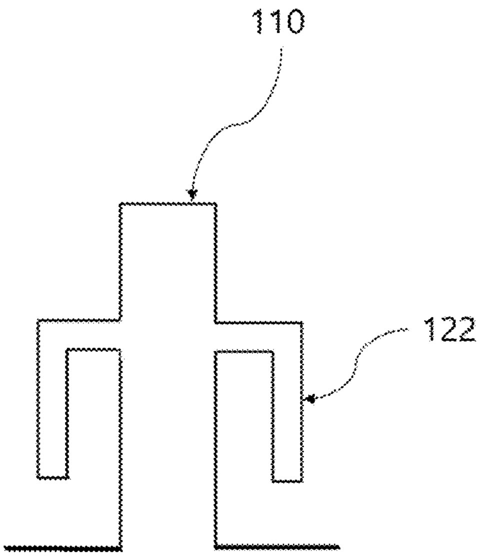

【FIG. 3b】
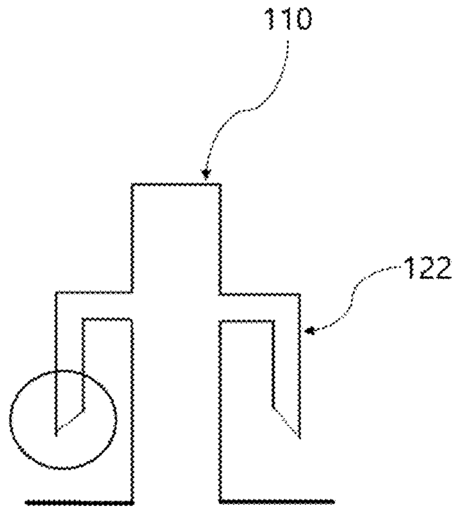
【FIG. 4】
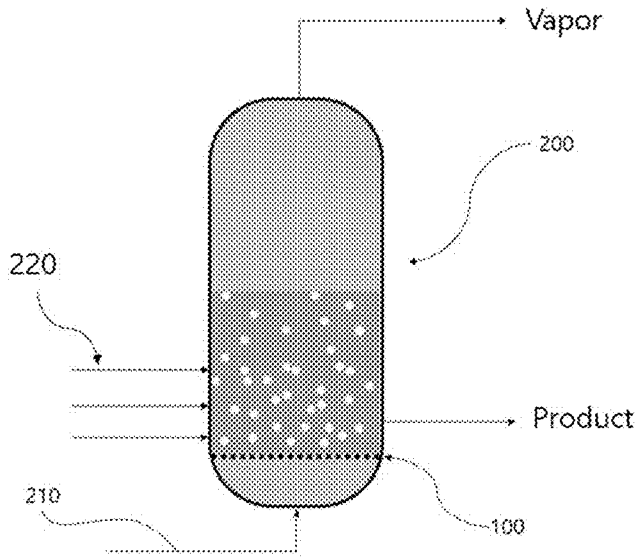

【FIG. 5a】
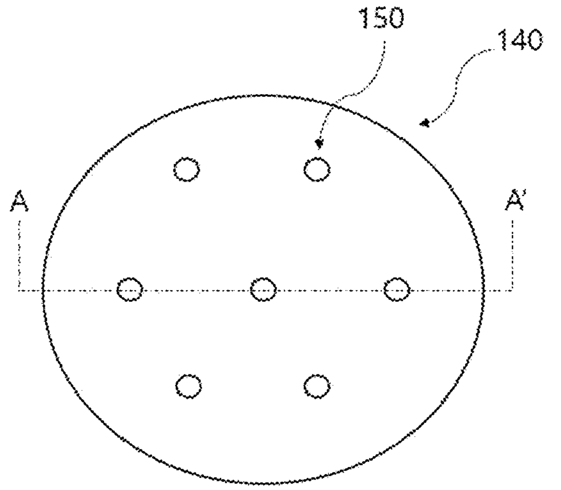
【FIG. 5b】
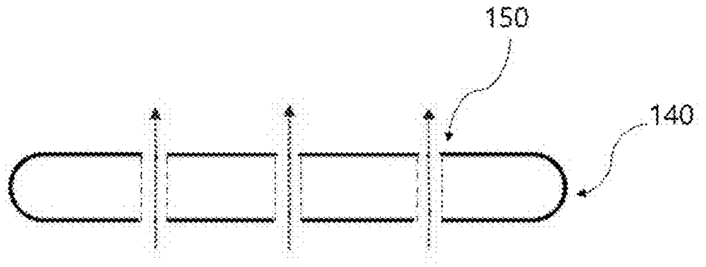

SPARGER AND REACTOR COMPRISING THE SAME

CROSS-REFERENCE TO RELATED APPLICATIONS

The present application is a national phase entry under 35 U.S.C. § 371 of International Application No. PCT/KR2022/009532, filed on Jul. 1, 2022, which claims priority from Korean Patent Application No. 10-2021-0159855, filed on Nov. 18, 2021, the entire contents of which are incorporated herein by reference in their entirety.

TECHNICAL FIELD

The present invention relates to a sparger, and more particularly, to a sparger which may improve both a mixing effect and a fouling prevention effect, and a reactor comprising the same.

BACKGROUND ART

An α-olefin (alpha-olefin) is an important material which is used in comonomers, cleaning agents, lubricants, plasticizers, and the like and is commercially widely used, and in particular, 1-hexene and 1-octene are often used as a comonomer for adjusting the density of polyethylene in the production of linear low-density polyethylene (LLDPE).

The α-olefins such as 1-hexene and 1-octene are produced representatively by an oligomerization reaction of ethylene. The ethylene oligomerization reaction is performed by an oligomerization reaction (trimerization reaction or tetramerization reaction) of ethylene in the presence of a catalyst by using ethylene as a reactant, and the product produced by the reaction includes not only a multi-component hydrocarbon mixture including 1-hexene and 1-octene to be desired but also a small amount of by-products including a polymer material of C20+ during a catalytic reaction. Since the product and the by-products are relatively heavy, they come down to a lower portion of a reaction region in a reactor. Thus, fouling in which holes of a sparger are blocked may occur and a product may be deposited on the sparger.

Thus, conventionally, there is a problem in incurring maintenance cost due to fouling occurrence, and the product is not obtained well by decreased mixing efficiency.

DISCLOSURE

Technical Problem

An object of the present invention is to provide a sparger which is designed to increase mixing efficiency and to decrease fouling occurrence, and a reactor comprising the sparger, in order to solve the above problems mentioned in Background Art.

Technical Solution

In one general aspect, a sparger includes: a main body including a plurality of holes, a protruding pipe extending upward along an outer circumferential surface of the plurality of holes, and a side pipe extending from a side surface of the protruding pipe.

In another general aspect, a reactor includes: a monomer supply line configured to supply a gaseous monomer stream, and the sparger of the present invention for dispersing the gaseous monomer stream supplied through the monomer supply line.

Advantageous Effects

According to the sparger of the present disclosure, a gaseous material which is a reactant is supplied to a reaction region in a reactor through a protruding pipe extending upward along an outer circumferential surface of holes of the sparger, thereby minimizing a fouling phenomenon in which the holes of the sparger are blocked by a reaction product or heavy by-products. Thus, an operation cycle of the reactor may be extended, and maintenance cost due to fouling may be reduced.

In addition, the gaseous material is sprayed downward through a side pipe extending from a side surface of the protruding pipe, thereby improving the mixing efficiency of an upper portion of the sparger. Thus, a reaction product may be discharged well to a product outlet to allow operation in accordance with a reaction design such as conversion rate improvement.

DESCRIPTION OF DRAWINGS

FIG. 1 is a plan view of a sparger according to an exemplary embodiment of the present invention.

FIG. 2 is a cross-sectional view of the sparger according to an exemplary embodiment of the present invention.

FIGS. 3*a* and 3*b* are cross-sectional views of a side pipe according to an exemplary embodiment of the present invention.

FIG. 4 is a reactor according to an exemplary embodiment of the present invention and a process flow diagram.

FIGS. 5*a* and 5*b* are a plan view and a cross-sectional view of a sparger according to the comparative examples.

DETAILED DESCRIPTION

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

In the present invention, the term "stream" may refer to a fluid flow in the process, or may refer to the fluid itself flowing in a moving line (pipe). Specifically, the "stream" may refer to both a fluid itself flowing in a pipe connecting each device and a fluid flow. In addition, the fluid may refer to inclusion of any one or more of gas, liquid, and solid.

In the present invention, "C#", in which "#" is a positive integer, represents all hydrocarbons having # carbon atoms. Therefore, the term "C10" represents a hydrocarbon compound having 10 carbon atoms. In addition, the term "C#+" represents all hydrocarbon molecules having # or more carbon atoms. Therefore, the term "C10+" represents a mixture of hydrocarbons having 10 or more carbon atoms.

Hereinafter, the present invention will be described by referring to FIGS. 1 to 4, for better understanding of the present invention.

First, referring to FIG. 1 and FIGS. 2 and 4, which is a longitudinal sectional view based on A-A' of FIG. 1, the sparger 100 according to the present disclosure may include a main body including a plurality of holes 130, protruding pipe 110 extending upward along an outer circumferential surface of the plurality of holes, and a side pipe 120 extending from a side surface of the protruding pipe.

According to an exemplary embodiment of the present invention, the sparger 100 is, for example, provided in a lower portion of a reactor 200, so that a gaseous monomer stream supplied to the reactor 200 may be dispersed upward and simultaneously, a liquid reaction medium in the reactor 200 may be mixed to improve a conversion rate of the monomer.

A main body of the sparger 100 may be freely designed depending on the shape of the reactor 200, and for example, the main body of the sparger 100 may be formed in a disc shape having an outer circumferential surface having the same structure as the inner surface of the reactor 200. Here, the outer circumferential surface of the main body may be designed to be closely adhered to the inner surface of the reactor 200.

The main body may have a diameter of, for example, 100 mm to 1500 mm, 100 mm to 1000 mm, or 100 mm to 500 mm, and a thickness of, for example, more than 0 mm and 100 mm or less, 1 mm to 50 mm, or 10 mm to 30 mm.

According to an exemplary embodiment of the present invention, the main body of the sparger 100 may include a hole 130 formed by penetrating upper and lower surfaces of the main body of the sparger 100. The hole 130 may be formed in plural at equal intervals in the center and along the circumference of the main body. Specifically, a gaseous material, for example, a monomer stream, which is supplied from the lower portion of the reactor, may be uniformly sprayed into a reaction region provided with a reaction medium inside the reactor 200, through the holes 130 formed at equal intervals in the center and along the circumference of the main body.

When the main body has a disc shape, the diameter of the hole 130 may be 1% to 50%, 1% to 30%, or 1% to 10% of the diameter of the main body. When the diameter of the hole 130 is within the range, the shutdown of the reactor due to the fouling in the sparger may be prevented, and also the mixing efficiency in the reactor is increased to minimize a dead volume, and thus, an effect of increasing a reaction conversion rate may be obtained.

The plurality of holes may have the same diameter, and holes having a relatively large diameter and holes having a relatively small diameter may be included. When the diameters of the holes are differently formed as such, a portion which is not mixed with a gaseous material passing through a hole having a relatively large diameter may be mixed with a gaseous material passing through a hole having a small diameter, and thus, the mixing efficiency of a liquid reaction medium in the reactor 200 may be increased.

Meanwhile, according to an exemplary embodiment of the present invention, the sparger 100 may include a protruding pipe 110 extending upward along the outer circumferential surface of each of the plurality of holes 130. The outer circumferential surface may refer to the outer circumferential surface of an opening formed by the hole 130 in the upper surface of the main body of the sparger 100. Therefore, the main body of the sparger 100 and the protruding pipe 110 may be integrally formed. Meanwhile, "upward" may refer to "toward the reaction region" provided with a reaction medium in the reactor 200.

The gaseous material, for example, a gaseous monomer stream, which is supplied from the lower portion of the sparger 100 through the hole 130, may pass through the main body of the sparger 100 through the hole, be dispersed in the reaction region through the protruding pipe 110, and be supplied. A flow of the gaseous material is indicated by a dotted line in FIG. 2.

That is, referring to FIGS. 5*a* and 5*b* regarding a conventional sparger 140, it is recognized that the upper portion of the main body of the sparger 140 and the upper surface of the opening of the hole 150 have the same or similar surface height. When the gaseous material (reactant) is supplied to the reaction region provided with the reaction medium in the upper portion of the sparger 140 through the sparger 140, the reaction product, heavy by-product, and the like produced by the reaction have a higher density than the reaction medium and sink down, and thus, blockage of the hole 150 (fouling) easily occurs. Furthermore, as the reaction proceeds, the reaction product and the heavy by-products are deposited on the upper surface of the main body of the sparger 140, and thus, uniform mixing was impossible.

However, the sparger 100 according to an exemplary embodiment of the present invention is provided with a protruding pipe 110, whereby the surface height of the protruding pipe 110 may be formed to be higher than the surface height of the upper surface of the main body of the sparger 100. Thus, a linear velocity of the gaseous monomer stream which passes through the sparger 100 and is supplied to the reactor is maintained constant, while a possibility of fouling occurrence may be lowered. Further, a wash cycle to shut down the reactor 200 and wash the inside of the reactor 200 and devices such as the sparger 100 may be extended. Furthermore, in the present invention in which the gaseous monomer is supplied to the reaction region through the protruding pipe 110, the gaseous monomer may be supplied to a deeper reaction region to secure a larger uniform reaction region as compared with the conventional technology, and thus, the performance of the reactor, for example, the conversion rate may be improved.

For this, the relationship between a height ($L_P$) of the protruding pipe, that is, a difference ($L_P$) between a surface height of an upper surface of the sparger 100 and a surface height of the protruding pipe and a thickness ($L_B$) of the main body of the sparger 100 may satisfy the following Equation 1:

$$L_P \geq L_B \quad \text{[Equation 1]}$$

wherein $L_P$ is a height of the protruding pipe, and $L_B$ is a thickness of the main body.

More specifically, the height ($L_P$) of the protruding pipe may satisfy $10\,L_B \geq L_P \geq L_B$, more specifically, $5\,L_B \geq L_P \geq L_B$. Within the range, an effect of maximizing a uniform reaction region and preventing the fouling of holes may be achieved.

Meanwhile, according to an exemplary embodiment of the present invention, the sparger 100 of the present invention may include a side pipe 120 extending from the side surface of the protruding pipe 110. The side pipe 120 may include a horizontal pipe part 121 which horizontally extends from the side surface of the protruding pipe 110 and a downward pipe part 122 which extends downward from the end of the horizontal pipe part. The end of the downward pipe part 122 and the upper end of the main body may be formed to be spaced apart.

Specifically, the sparger may be configured such that a gaseous material (gaseous monomer) supplied from the lower portion of the main body of the sparger 100 through a plurality of holes 130 passes through the protruding pipe 110 and moves upward, and the sparger may be further configured such that in this process, a part of the gaseous material moving through the protruding pipe 110 may be discharged through the side pipe 120. That is, a part of the gaseous material passes through the horizontal pipe part 121 which extends in a direction parallel to the upper surface of the sparger 100, of the side pipe 120, and the downward pipe part 122 which extends downward so as to face the upper surface of the sparger 100, of the side pipe 120, sequentially, thereby being sprayed on the upper surface of the main body of the sparger 100.

Here, the sparger may be configured such that the flow rate of the gaseous material discharged through the side pipe 120 may be 5% to 15% of the flow rate of the gaseous material supplied through the holes. That is, when the flow rate of the gaseous material discharged from the side pipe 120 is 5% or more, the effect of increasing the mixing efficiency to the upper surface of the main body of the sparger 100 may be achieved, and when the flow rate is 15% or less, the gaseous material may be sufficiently transferred to the reaction region through the protruding pipe 110 and the reaction region is secured to the maximum, thereby obtaining an effect such as an increase in a conversion rate.

As described above, since the reaction product, the heavy by-products, and the like produced by the reaction has a relatively high density, they may sink toward the sparger 100 or be deposited on the sparger 100. The product and the heavy by-products of the reaction may be mixed by the flow of the gaseous material which is discharged and sprayed through the downward pipe part 122, which increases the mixing efficiency to minimize a dead volume, and on the other hand, may obtain an effect of increasing a reaction conversion rate.

According to an exemplary embodiment of the present invention, the end of the downward pipe part 122 may include an inclined part so that the surface height of a portion adjacent to the protruding pipe 110 is high. That is, referring to FIGS. 3*a* and 3*b*, the surface height of the end of the downward pipe part 122 may be formed to be the same as shown in FIG. 3*a*, or the surface height of the end of the downward pipe part 122 is formed so that the surface height of the portion adjacent to the protruding pipe 110 is high as shown in FIG. 3*b*, and thus, the inclined part may be entirely introduced. That is, as shown in FIG. 3*b*, the surface height of the portion adjacent to the protruding pipe 110 is higher than the opposing portion. When the inclined part is introduced to the end of the downward pipe part 122, the spraying strength of the gaseous material discharged through the downward pipe part 122 may be increased, thereby increasing the mixing efficiency for the upper surface of the main body of the sparger 100.

According to an exemplary embodiment of the present invention, an angle between the horizontal pipe part 121 and the downward pipe part 122 may be 75° to 135°. As described above, the sparger 100 may include a plurality of holes 130 formed along the circumference in the center of the main body. For example, in the case of hole 130 of which the position is adjacent to the circumference of the main body of the sparger 100, that is, the hole 130 adjacent to the side wall of the reactor, the angle between the horizontal pipe part 121 and the downward pipe part 122 may be formed to be larger than 90°. Thus, the gaseous material is sprayed and dispersed more directly on/in the reaction product, the heavy by-products, and the like deposited on a part where the reactor side wall and the sparger 100 are connected, thereby further improving the mixing efficiency.

Likewise, the number of side pipes 120 extending from one protruding pipe 110 may be 2 to 4. For example, when a spacing between holes 130 of the sparger 100 is narrow, the number of the side pipe 120 extending from the one protruding pipe 110 may be 2, and when a spacing between holes 130 is large, the number may be 4, thereby improving the mixing efficiency depending on the spraying of the gaseous material.

Meanwhile, according to the present disclosure, a reactor 200 comprising the sparger 100 is provided. Specifically, as shown in FIG. 4, the reactor 200 may include a monomer supply line 210 configured to supply a gaseous monomer stream; and the sparger 100 according to the present disclosure for dispersing the gaseous monomer stream supplied through the monomer supply line 210.

According to an exemplary embodiment of the present invention, the reactor 200 may be a reactor appropriate for a continuous process. For example, the reactor 200 may include any one or more reactors selected from the group consisting of a continuous stirred-tank reactor, a plug flow reactor, and a bubble column reactor. As a specific example, the reactor 200 may be a bubble column reactor. Thus, the monomer may be continuously reacted.

According to an exemplary embodiment of the present invention, the reactor 200 may be for producing an oligomer by oligomerizing a monomer in the presence of a catalyst and a solvent.

That is, referring to FIG. 4, a catalyst, a cocatalyst, and a solvent may be supplied from the side portion of the reactor 200 to the reaction region in the reactor through each supply line 220. The catalyst, the cocatalyst, and the solvent may be supplied to each separate supply line 220 as shown in FIG. 4, and the catalyst may be mixed with the solvent, the cocatalyst may be mixed with the solvent, and supplied through two supply lines.

The monomer may include ethylene. Specifically, a gaseous monomer stream including an ethylene monomer is introduced into the reactor 200 through a monomer supply line 210 provided in a lower portion of the reactor 200, and the gaseous monomer stream is dispersed by the sparger 100 and oligomerized in a reaction medium in the reactor 200, thereby producing an α-olefin product to be desired.

According to an exemplary embodiment of the present invention, a spraying part extending from the monomer supply line and provided may be further included. A gaseous ethylene monomer transferred through the monomer supply line 210 may be sprayed through the spray part and pass through the sparger 100.

The spray part may be formed to be extended from the monomer supply line 210 and branched into multiple pipes, and a spray nozzle may be formed at each end of the branched multiple pipes. Specifically, the gaseous ethylene monomer transferred through the monomer supply line 210 may be introduced to the reactor 200 through the spray nozzle of the spray part. As such, the gaseous ethylene monomer introduced to the reactor 200 may pass through the sparger 100 and be sprayed in the upper direction of the reactor 200. As such, since the spray part is provided, an additional apparatus such as a conventional deflector is not needed, and a difficulty in maintaining a constant linear velocity of the gaseous monomer stream when the conventional deflector is used may be solved. As such, the linear velocity of the gaseous monomer stream is maintained constant, whereby a dispersion degree of a reaction solution and the by-products in the reactor may be maintained uniform and accumulation of the by-products on one side may be prevented.

The oligomerization reaction is carried out in a lower or a middle of the reaction region of the reactor 200, and the oligomerization reaction of the monomer may be carried out in a liquid state being dissolved in a solvent in the presence of a catalyst and a cocatalyst.

The oligomerization reaction may refer to a reaction in which a monomer is oligomerized. The oligomerization may be referred to as trimerization or tetramerization depending on the number of monomers to be polymerized, and these are collectively called multimerization.

In the oligomerization reaction of the monomer, an unreacted monomer and a vaporized solvent in the reactor 200 may be discharged to the upper portion of the reactor 200, which may be circulated to the reactor 200 and reused in the oligomerization reaction of the monomer. In addition, the oligomer produced by the oligomerization reaction of the monomer may be obtained by separation through the lower side of the reactor 200.

The α-olefin, which is an important material used in copolymers, cleaning agents, lubricants, plasticizers, and the like, is commercially widely used, and in particular, 1-hexene and 1-octene are often used as a comonomer for adjusting the density of polyethylene in the preparation of linear low-density polyethylene (LLDPE). The α-olefin such as 1-hexene and 1-octene may be produced by, for example, a trimerization reaction or tetramerization reaction of an ethylene monomer.

The oligomerization reaction of the monomer may be carried out by a homogeneous liquid phase reaction, a slurry reaction in which the catalyst is in the form of being partially not dissolved or completely not dissolved, a two-phase liquid/liquid reaction, or a bulk phase reaction or gas phase reaction of which the product acts as a main medium, in the presence or absence of a solvent, by applying the reaction system and a common contact technology.

The solvent, the catalyst, and the cocatalyst may be supplied in a liquid phase to the lower side of the reactor 200.

The catalyst may include a transition metal source. The transition metal source may be, for example, a compound including one or more selected from the group consisting of chromium (III) acetylacetonate, chromium (III) chloride tetrahydrofuran, chromium (III) 2-ethylhexanoate, chromium (III) tris(2,2,6,6-tetramethyl-3,5-heptanedionate), chromium (III) benzoylacetonate, chromium (III) hexafluoro-2,4-pentanedionate, chromium (III) acetate hydroxide, chromium (III) acetate, chromium (III) butyrate, chromium (III) pentanoate, chromium (III) laurate, and chromium (III) stearate.

The cocatalyst may include, for example, one or more selected from the group consisting of trimethyl aluminum, triethyl aluminum, triisopropyl aluminum, triisobutyl aluminum, ethylaluminum sesquichloride, diethylaluminum chloride, ethyl aluminum dichloride, methylaluminoxane, modified methylaluminoxane, and borate.

The solvent used in the oligomerization reaction of a monomer may include one or more selected from the group consisting of n-pentane, n-hexane, n-heptane, cyclohexane, methylcyclohexane, octane, cyclooctane, decane, dodecane, benzene, xylene, 1,3,5-trimethylbenzene, toluene, ethylbenzene, chlorobenzene, dichlorobenzene, and trichlorobenzene.

As such, in the process of oligomerizing a monomer in the presence of the catalyst and the solvent, adhesive by-products such as polymers are produced in addition to an oligomer product. The by-products may block holes formed in the sparger 100 to cause fouling.

Regarding this, the reactor 200 according to the present disclosure uses the sparger 100 according to the present disclosure described above, thereby preventing blockage of the holes in the sparger 100 due to the fouling to extend the wash cycle of the reactor 200, and thus, preventing a production decrease due to a decreased operation time and reducing costs required in the wash process.

According to an exemplary embodiment of the present invention, in the reactor 200, an apparatus required for oligomer production such as a valve, a condenser, a reboiler, a pump, a cooling facility, a filter, an agitator, a compressor, and a mixer may be further installed, if necessary.

Hereinabove, the sparger according to the present invention and the reactor comprising the same have been described and illustrated in the drawings; however, the description and the illustration in the drawings are the description and the illustration of only core constitutions for understanding of the present invention, and in addition to the process and apparatus described above and illustrated in the drawings, the process and the apparatus which are not described and illustrated separately may be appropriately applied and used for using the sparger according to the present invention n and the reactor comprising the same.

Hereinafter, the present invention will be described in more detail by the examples. However, the following examples are provided for illustrating the present invention, and it is apparent to a person skilled in the art that various modifications and alterations may be made without departing from the scope and spirit of the present invention and the scope of the present invention is not limited thereto.

Example 1

A sparger 100 according to FIG. 1 according to the present disclosure was provided in a bubble column reactor 200, as shown in FIG. 4, and the oligomerization reaction of an ethylene monomer was performed. Specifically, a solvent, a catalyst, and a cocatalyst were supplied to a lower side of the reactor 200, a gaseous ethylene monomer stream was supplied through a monomer supply line 210 provided in a lower portion of the reactor 200, and the sparger 100 was used to disperse the stream upward to perform an oligomerization reaction in a liquid reaction medium in the reactor 200. An α-olefin produced by the oligomerization reaction was separated in the lower side of the reactor 200 and obtained, and an unreacted monomer and a vaporized solvent were discharged to an upper portion of the reactor 200.

At this time, the diameter of the main body of the sparger 100 was formed to be 300 mm, the thickness of the main body of the sparger 100 was formed to be 20 mm, the height of the protruding pipe 110 was formed to be 60 mm, and a side pipe 120 was provided in the side surface of the protruding pipe 110.

In this case, it was confirmed that a part of the gaseous ethylene monomer stream passed through the protruding pipe 110 of the sparger 100 and was supplied to a reaction region, and the remaining ethylene monomer stream passed through a side pipe and was sprayed on the upper surface of the main body of the sparger 100.

As a result of Example 1, the mixing efficiency of the ethylene monomer was increased to increase the production amount of the α-olefin. In addition, fouling occurrence in the sparger 100 was decreased to extend a shutdown cycle for washing the reactor 200.

Comparative Example 1

The process was performed in the same manner as in Example 1, except that a sparger 140 which did not have the protruding pipe and the side pipe, so that the surface height of the hole 150 and the surface height of the main body of the sparger 140 were the same, as shown in FIGS. 5*a* and 5*b*, was used as the sparger 140, In this case, it was confirmed that the mixing efficiency of the ethylene monomer was decreased as compared with Example 1 so that the production amount of α-olefin was decreased, and a fouling occurrence rate in the sparger 140 was increased to shorten the shutdown cycle for washing the reactor 200.

The invention claimed is:

1. A sparger comprising:

a main body including a plurality of holes;

a protruding pipe extending upward along an outer circumferential surface of the plurality of holes; and a side pipe extending from a side surface of the protruding pipe, wherein the sparger is configured such that a gaseous material is supplied from a lower portion of the main body through the plurality of holes to pass through the protruding pipe and move upward, and the sparger is configured such that a portion of the gaseous material moving through the protruding pipe is discharged through the side pipe, and a remaining portion of the gaseous material moving through the protruding pipe is discharged directly from an end of the protruding pipe.

2. The sparger of claim 1, wherein the side pipe includes:

a horizontal pipe part which horizontally extends from the side surface of the protruding pipe; and a downward pipe part which extends downward from an end of the horizontal pipe part.

3. The sparger of claim 2, wherein an end of the downward pipe part and an upper end of the main body are spaced apart.

4. The sparger of claim 2, wherein an end of the downward pipe part includes an inclined part so that a surface height of a portion adjacent to the protruding pipe is higher than an opposing portion.

5. The sparger of claim 2, wherein an angle between the horizontal pipe part and the downward pipe part is 75° to 135°.

6. The sparger of claim 1, wherein the sparger is configured such that a flow rate of the gaseous material discharged through the side pipe is 5% to 15% of a flow rate of the gaseous material supplied through the holes.

7. The sparger of claim 1, wherein the sparger satisfies the following Equation 1:

$$L_P \geq L_B \quad \text{[Equation 1]}$$

wherein $L_P$ is a height of the protruding pipe, and $L_B$ is a thickness of the main body.

8. The sparger of claim 1, wherein the side pipe is 2 to 4 side pipes.

9. A reactor comprising:

a monomer supply line configured to supply a gaseous monomer stream; and the sparger of claim 1 for dispersing the gaseous monomer stream supplied through the monomer supply line.

10. The sparger of claim 1, wherein the sparger is configured such that a flow rate of the gaseous material discharged directly from the end of the protruding pipe is 85% to 95% of a flow rate of the gaseous material supplied through the holes.

* * * * *